United States Patent
Friedrichs et al.

(10) Patent No.: US 8,045,812 B2
(45) Date of Patent: Oct. 25, 2011

(54) METHOD AND SYSTEM FOR INITIALIZING TEMPLATES OF MOVING OBJECTS

(75) Inventors: Fabian Friedrichs, Stuttgart (DE);
Muhammad Siddiqui, Stuttgart (DE);
Klaus Zimmermann, Deizisau (DE)

(73) Assignee: Sony Deutschland GmbH, Berlin (DE)

( * ) Notice: Subject to any disclaimer, the term of this patent is extended or adjusted under 35 U.S.C. 154(b) by 824 days.

(21) Appl. No.: 12/098,640

(22) Filed: Apr. 7, 2008

(65) Prior Publication Data

US 2008/0273806 A1    Nov. 6, 2008

(30) Foreign Application Priority Data

May 3, 2007   (EP) .................................. 07008960

(51) Int. Cl.
*G06K 9/36* (2006.01)

(52) U.S. Cl. ........................ 382/236; 382/232

(58) Field of Classification Search .............. 382/236, 382/203, 199, 232; 375/240.01, E7.124; 348/700, E5.065, E5.067

See application file for complete search history.

(56) References Cited

U.S. PATENT DOCUMENTS

| | | | |
|---|---|---|---|
| 5,583,949 A * | 12/1996 | Smith et al. | 382/199 |
| 6,055,025 A * | 4/2000 | Shahraray | 348/700 |
| 6,847,680 B2 * | 1/2005 | Divakaran et al. | 375/240.01 |
| 2006/0088191 A1 | 4/2006 | Zhang et al. | 382/107 |
| 2007/0014432 A1 | 1/2007 | Tsunashima | 382/103 |

FOREIGN PATENT DOCUMENTS

| | | |
|---|---|---|
| AU | 2002318859 A1 | 8/2003 |
| WO | WO 2004/013810 A1 | 2/2004 |

OTHER PUBLICATIONS

Jianping Fan et al., "Statistical Approaches to Tracking-Based Moving Object Extraction", Information Intelligence and Systems Proceedings, Oct. 31-Nov. 3, 1999, Sections 4 and 5, ISBN: 0-7695-0446-9, XP010362228, pp. 375-381.

U.S. Appl. No. 12/114,239, filed May 2, 2008, Friedrichs, et al.

G. N. Stamou, et al., "Object Tracking Based on Multiscale Morphological Templates", EURASIP European Signal Processing Conf. (EUSIPCO 2005), Sep. 4-8, 2005, pp. 1-4.

P. Chalimbaud, et al., "The task 'template tracking' in a sensor dedicated to active vision", IEEE International Workshop on Computer Architectures for Machine Perception, May 12-16, 2003, pp. 1-7.

Iain Matthews, et al., "The Template Update Problem", IEEE Transactions on Pattern Analysts and Machine Intelligence, vol. 26, Issue 6, Jun. 2004, pp. 1-15.

Chinese Office Action issued on Jun. 15, 2011 in corresponding Chinese Application No. 200810092819.X (English Translation Only).

* cited by examiner

*Primary Examiner* — Anh Hong Do

(74) *Attorney, Agent, or Firm* — Oblon, Spivak, McClelland, Maier & Neustadt, L.L.P.

(57) ABSTRACT

A method for tracking a moving object in a sequence of images is provided, comprising: partitioning each of said images of said sequence into blocks, identifying blocks which have moved between consecutive images of said sequence, grouping adjacent blocks, which have moved in a same direction by a same distance, into a first group of blocks, initializing an initial template for said moving object with said first group of blocks and tracking said template in said sequence of images. A corresponding system for tracking moving objects is presented as well.

12 Claims, 5 Drawing Sheets

METHOD AND SYSTEM FOR INITIALIZING TEMPLATES OF MOVING OBJECTS

BACKGROUND

In image processing template tracking is used e.g. for tracking of faces in videos, or for satellite surveillance. Also in front view cameras in automotive applications template tracking is used for tracking movements of vehicles in front of an own vehicle. The templates are usually initialized manually or by classification, which is possible, since the perspective does not change in front view applications. However, in side-view applications or blind spot monitoring for vehicles, the perspective changes and commonly used classification cannot be performed.

It is an object of the invention to provide a improved method and an improved system for initializing templates of moving objects.

The object is solved by a method, a system and a computer program product according to claims 1, 9 and 12.

Further embodiments are defined in the dependent claims.

Further details of the invention will become apparent from a consideration of the drawings and ensuing description.

DETAILED DESCRIPTION

In the following, embodiments of the invention are described. It is important to note, that all described embodiments in the following may be combined in any way, i.e. there is no limitation that certain described embodiments may not be combined with others.

Figure 1A:
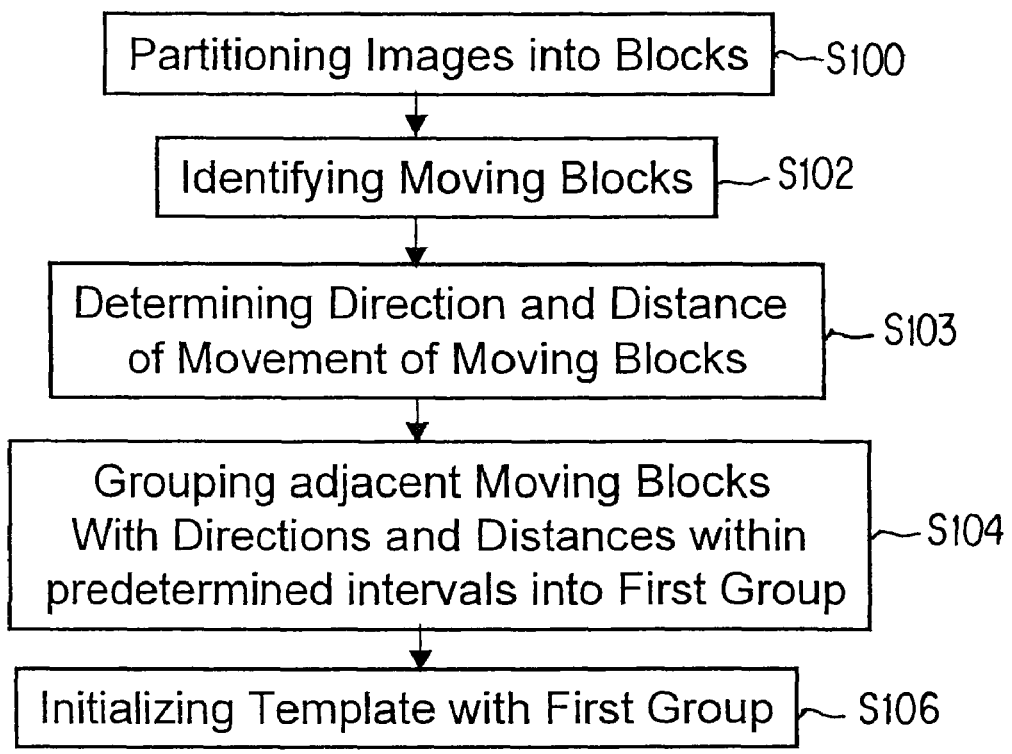
FIG. 1a shows main steps of one embodiment of the invention, explaining motion estimation and segmentation steps.

In FIG. 1a, in step S100 each of the images of a sequence are partitioned into blocks. Each block might comprise 8×8 or 16×16 pixels, but not only square blocks but blocks of other shapes or with another number of pixels are also possible. Images might be referred to also by "frames" or "fields". The images are taken, e.g. by a digital video camera and are stored pixel-wise in a memory.

In step S102 blocks which have been moved between consecutive images of said sequence are identified. Such movement of block might be detected by calculating an error criterion for possible block displacements. The sum of absolute differences, the correlation product or other methods can be used as match criteria, for instance.

In step S103 a distance and a direction of the movement is determined, e.g. by comparing the position of the moving blocks in consecutive images. The movement in a "similar" direction by a "similar" distance might also be determined by calculating a motion vector between blocks of consecutive images and comparing said motion vector.

In step S104 adjacent blocks, for which directions within a predetermined direction interval and distances within a predetermined distance interval have been determined are grouped in a first group. The predetermined direction interval and the predetermined distance interval are used to detect a movement in basically the same direction by basically a same distance. The predetermined intervals might be fixed or might be adaptive, e.g. to the actual directions or distances of said moving blocks.

Thus, moving blocks which basically move in the same direction by a same distance are grouped together.

In case further moving objects are present within said sequence of images and these moving objects move differently, corresponding further groups might be generated by grouping corresponding further blocks with movements in basically the same direction and basically the same distance as described above.

Instead of the wording "grouping" also the wording "segmenting", "segmentation" or "clustering" is used within this description.

A block might be considered to be adjacent to a further block if the block is at least one of four (or eight) direct neighboring blocks of the further block.

In step S106 an initial template for said moving object is initialized with said first group of blocks. Since this first group of blocks moves "together" such group of blocks is considered to belong to one moving object. So this one moving object is defined by this first group and a corresponding initial template for this moving object is build by using this group of blocks. The pixel values of said group of blocks describe an outer appearance of this moving object.

With this approach well-fitted segmentation outlines of the entire object are used as the initial template, instead of using small blocks at fixed positions, which might partially cover background.

Figure 1B:
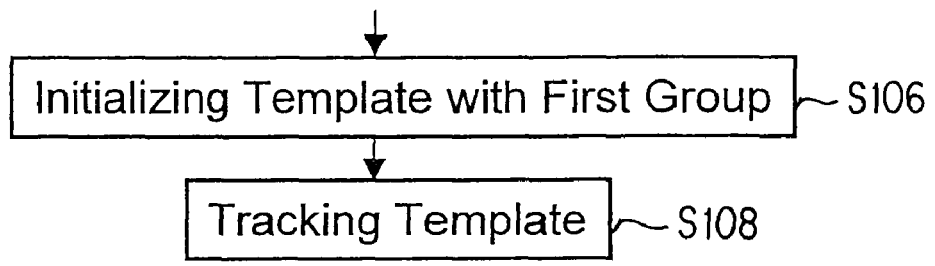
FIG. 1b shows main steps of a combination of initializing the template and afterwards tracking the template.

In FIG. 1b, additionally a step S108 is performed, wherein said initial template is tracked in said sequence of images, by evaluating cross-correlation or sum of absolute differences (SAD), for instance.

With the proposed method in automotive computer vision, obstacles (cars, truck, etc.) can be detected and tracked afterwards. No classification is needed. In consumer electronics, the proposed method improves the performance of motion estimation based video processing applications such as frame rate conversion or temporal noise reduction.

In a further embodiment said sequence is extended with further images moving blocks which have performed a movement between at least a part of said further images of said sequence are identified, a direction and a distance of said movement of said moving blocks are determined, and adjacent moving blocks, for which directions within a predetermined direction interval and distances within a predetermined distance interval have been determined are grouped into a second group of blocks. Thus blocks, which have moved within at least a part of said further images in a "similar" direction by a "similar distance", e.g. detected by evaluating corresponding motion vectors of blocks, are grouped into the second group of blocks. Afterwards the template is updated for said moving object with said second group of blocks. For instance, after a predetermined number of frames the initial template might be updated by a current match, i.e. the second group of blocks.

The proposed method for updating the template can easily cope with scale changes of objects, which occur, when the object is approaching or moving away, with shape changes, which happens, when an object is deformed, with rotation, which occurs in an object as rotating in any direction and with occlusion, which is happening when new pixels are obscured behind a moving object or revealed in front of a moving object. With the proposed method no errors are added up over time, which otherwise would result in a template drifting away from the tracked object until the tracking looses the object.

In a further embodiment said template is tracked based on a sum of absolute differences and/or a cross correlation between said template and parts of the images, in which the template should be tracked.

According to a further embodiment a search range is set around an area, where the object is expected in a subsequent image of said sequence according to its motion behavior in previous images of said sequence; and said step of tracking is performed in said search range in said subsequent image. With this approach the processing time for tracking the template might easily be reduced, since there is no need to track the template in the whole image.

In a further embodiment a correlation between the template and parts of said images of said sequence is calculated and a failure of said step of tracking is detected, if said correlation is below a predetermined correlation threshold. Thus, an update of the template might be started after such a failure of tracking the correct template within said sequence.

So the template might be updated continuously, based on e.g. predetermined time intervals which have passed or based on measurement values, which indicate that a further update might be performed, because e.g. the correlation between the used template and the images of said sequence is decreasing.

In a further embodiment an average motion vector is determined for coherent blocks of said images (representing a moving object of car) and a template motion vector for said template in subsequent images is determined as well. The template motion vector is compared to said average motion vector and said template is rejected, in case of a mismatch between said average motion vector and said template motion vector.

With the proposed use of motion estimation continuously in parallel, template tracking can be used for cross verification. False alarms which occur with motion estimation can be reduced by comparing the motion estimation results with the template tracking results. If these results match well, the template can be updated according to the motion estimation segmentation results. Otherwise, this mismatch indicates problems and may result in rejecting the template.

In a further embodiment said images of said sequence are pre-processed with a global motion estimation and global motion compensation. Within the global motion estimation and global motion compensation effects are considered, which influence all pixels of an image, e.g. due to a pan of a video camera etc. This method is suitable in particular for consumer electronics applications as frame rate conversion, temporal noise reduction, de-interlacing, etc. The global motion estimation and compensation is used to segment all locally moving objects.

In a further embodiment, said method is used for detecting moving objects in a blind spot region of a vehicle, wherein said moving objects are moving backwards in said blind spot region with respect to a movement of said vehicle. Since motion estimation methods do not perform well to detect backwards moving obstacles, the proposed method is used to initialize the template of slowing down vehicles. Slowing down means here that a vehicle has a faster relative velocity at the beginning and is then slowing down to a negative relative velocity. Therewith, automotive safety applications like blind spot region detection can be improved.

Figure 2:
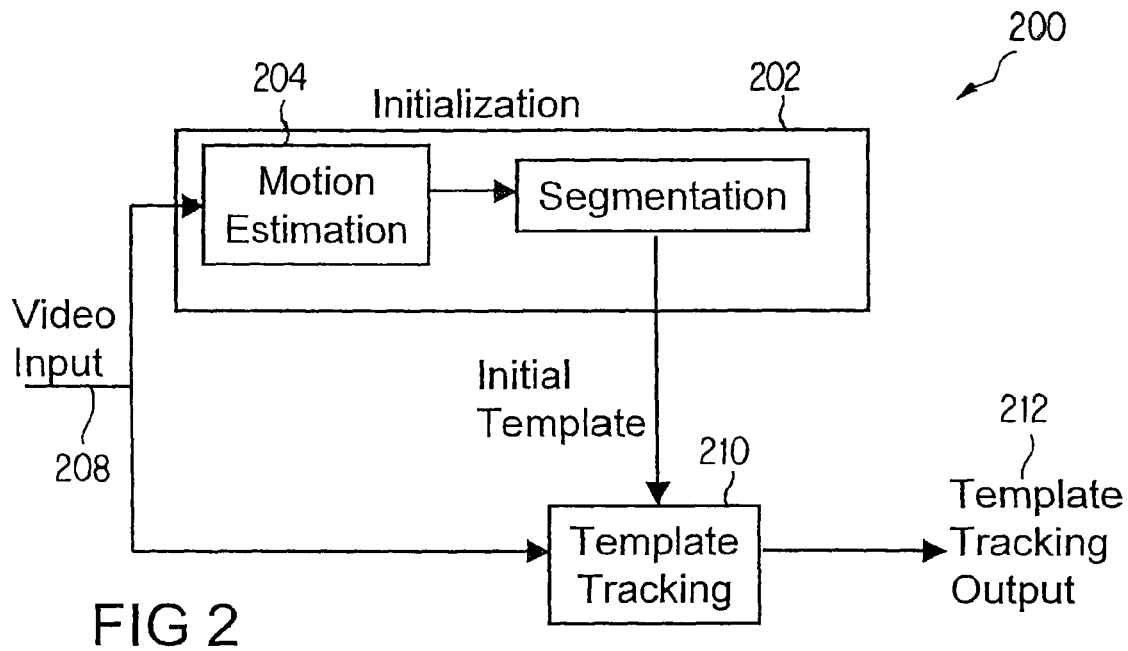
FIG. 2 shows a block diagram of a further embodiment of the invention, as it might be applied in automotive computer vision.

In FIG. 2 a block diagram of a further embodiment of the invention is depicted. The depicted system 200 for tracking templates of a moving object comprise an initialization unit 202 which includes a local motion estimation unit 204 and a segmentation unit 206. A video input 208, which consists of a sequence of images is inputted into the initialization unit 202 and the local motion estimation unit 204 partitions each of said images of said sequence into blocks and identifies moving blocks which have moved between consecutive images of said sequence. Afterwards, the segmentation unit 206 initializes a template for said moving objects by grouping adjacent moving blocks, for which directions within a predetermined direction interval and distances within a predetermined distance interval have been determined as it has been described before.

The initialized template is used by a tracking unit 210, which is configured to track said template in said sequence of images delivered by the video input 208. In case such a template is tracked it is output to a template tracking output 212.

Figure 3:
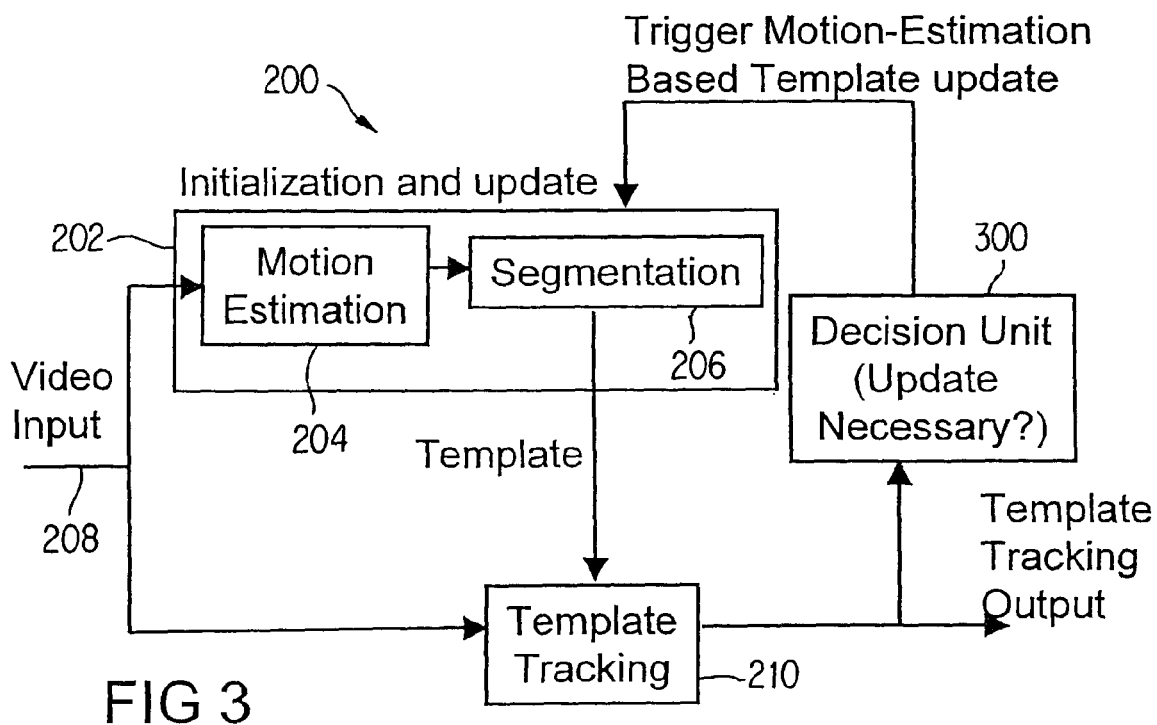
FIG. 3 shows a block diagram of a further embodiment of the invention, where the initialization unit is just triggered if an update is necessary.

In a further embodiment, depicted in FIG. 3 of the system 200 to track templates of moving objects, additionally a decision unit 300 is connected to the output of the tracking unit 210. The decision unit decides whether an update of said template should be performed. For example after a predetermined time or after an evaluated low correlation between the template and the images of the sequence the decision unit might trigger a motion based template update from the initialization unit 202.

The initialization unit 202 performs the motion estimation and groups adjacent blocks which moved for a predetermined time into a "similar" direction for a "similar" distance into a second group, as it has been described above. This second group represents the "new" or "updated" version of the initial template, and thus, the second group is used to update the template which is used afterwards by the tracking unit 210.

Figure 4:
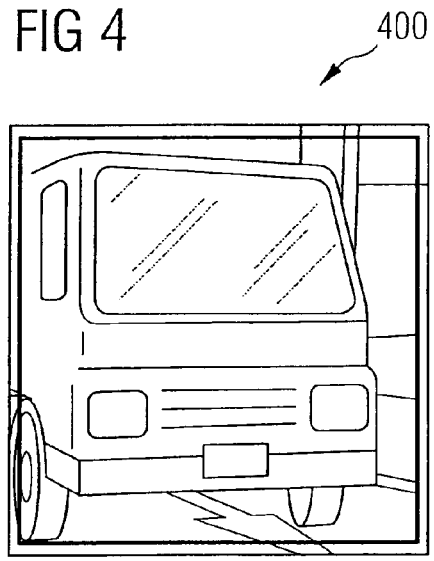
FIG. 4 shows an exemplary template as used in a further embodiment of the invention.

In FIG. 4 an example of an initialized template 400 is depicted, which shows the front side of the van, which has been initialized by the proposed method, while taking images with a camera mounted on a rear view mirror of a vehicle, thereby detecting moving objects on an adjacent lane.

Figure 5:
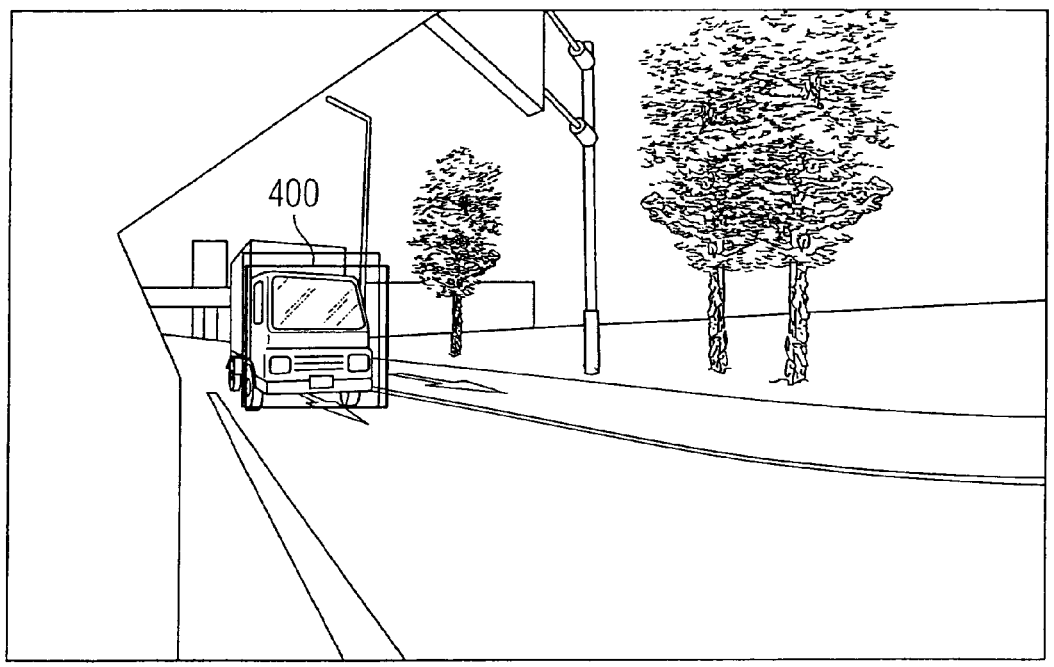
FIG. 5 shows an exemplary image, in which the template from FIG. 4 is tracked.

In FIG. 5 a whole image, which is taken by the camera is depicted, wherein the tracked template 400 is marked with a white square. With the proposed method moving objects on an adjacent lane may be detected easily and can be used to derive warning information for a driver of the vehicle, in case the driver intends to change the lane.

Figure 6:
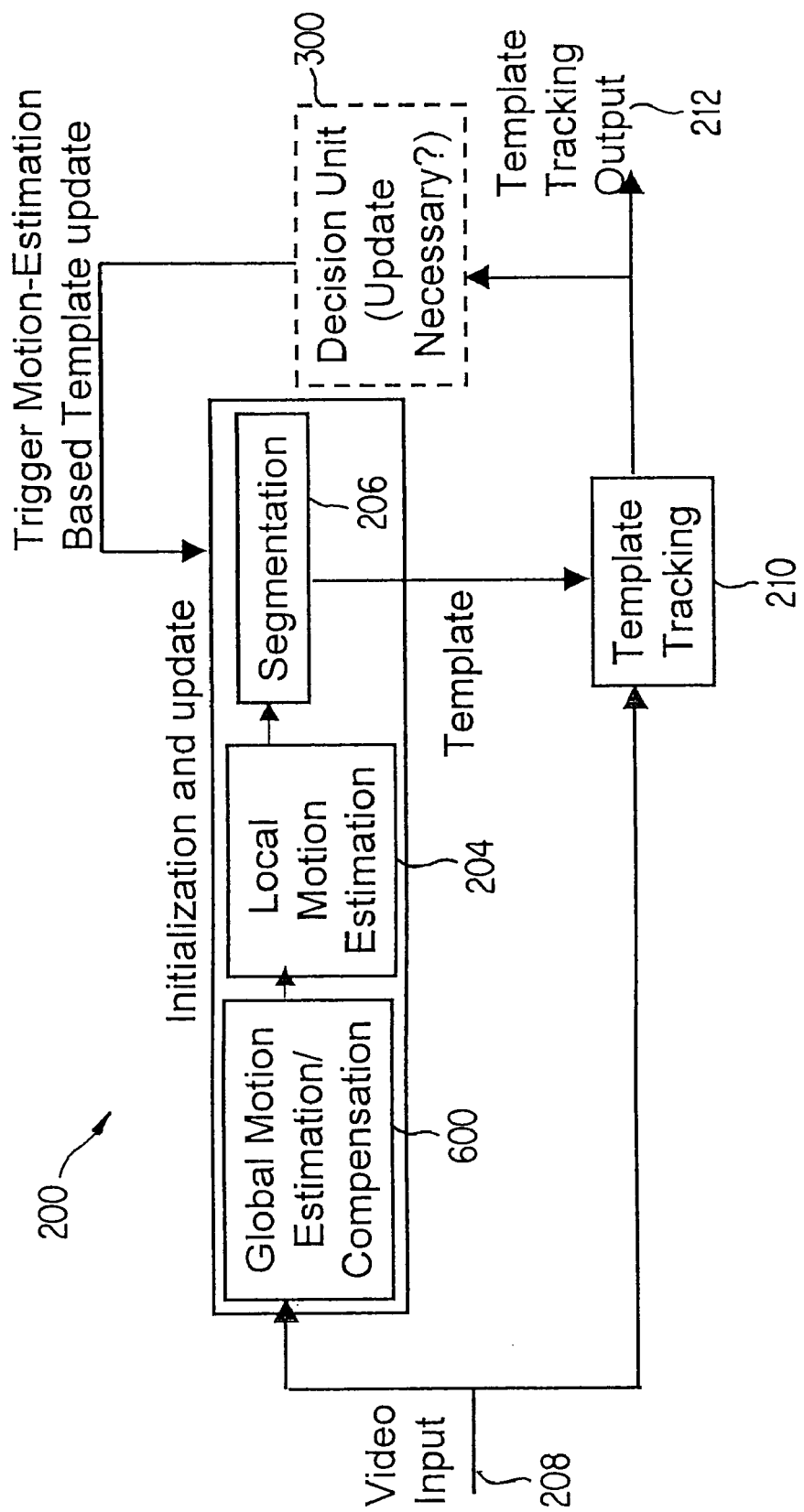
FIG. 6 shows a block diagram of a further embodiment of the invention as it can be applied for consumer electronics with arbitrary content/video sequences.

In a further embodiment, which is depicted in FIG. 6 and which is well suited for being applied to consumer product applications, a global motion estimation/compensation unit is used to pre-process the sequence of images delivered by the video input 208. This global motion estimation/compensation unit 600 is used to compensate the movement, which took place for the whole image, for example due to a movement of the camera, which took the images of the sequence. With this global motion estimation/compensation unit 600 the system 200 can segment all locally moving objects within the segmentation unit 206.

In case an update of a derived template should be used, the decision unit 300 might be used as it is described with respect to FIG. 3, but this decision unit 300 is only optional, which is depicted in FIG. 6 with a dotted line.

Figure 7:
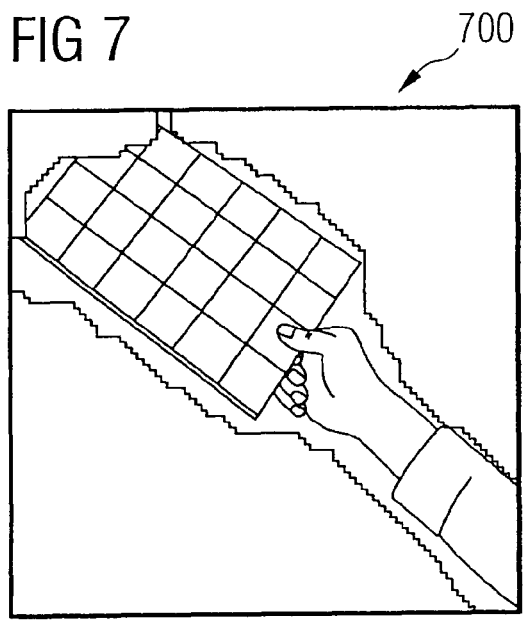
FIG. 7 shows a further exemplary template as used in a further embodiment of the invention for consumer electronics.
Figure 8:
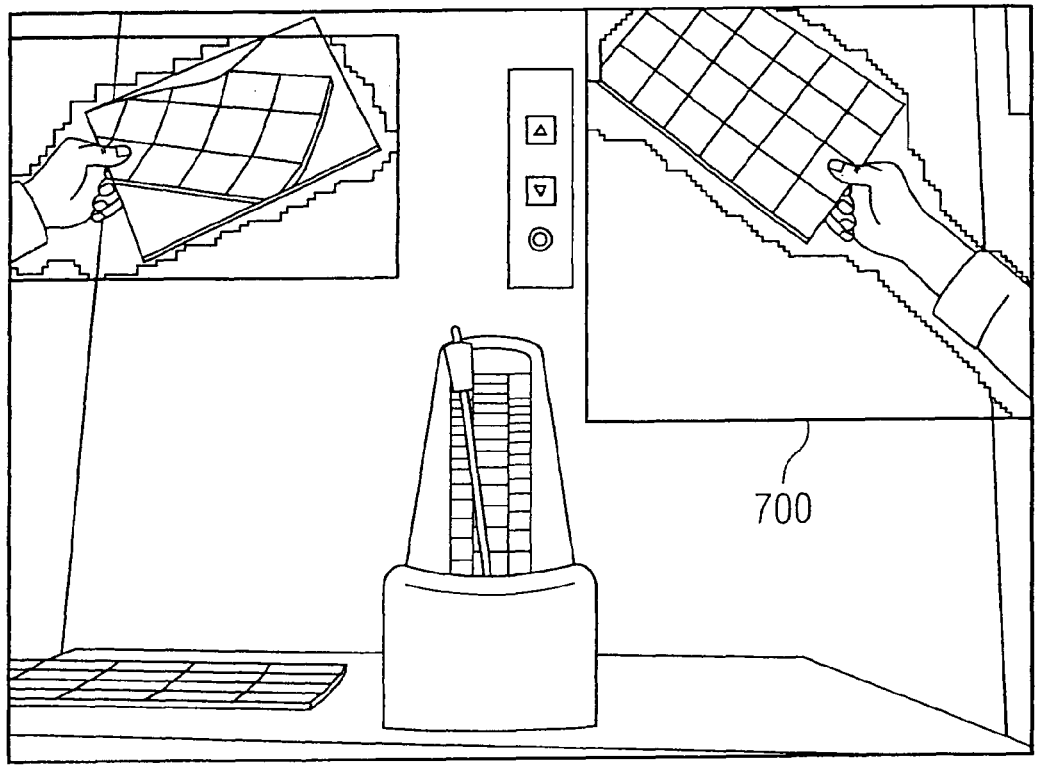
FIG. 8 shows a further exemplary consumer electronics image with a tracked template from FIG. 7.

In FIG. 7 an example of an extracted template 700 of a consumer electronics sequence, depicted in FIG. 8, is depicted. Motion estimation usually has problems with such kind of movements, because the moving objects obscure other moving objects in the background. As it is depicted in FIG. 7, the object is well segmented and the other parts of the image are not considered in the correlation or filled with zeros or equally distributed noise.

According to a further embodiment a computer program product is provided, which comprises a computer program code which when loaded into a processor performs the proposed method for tracking the moving object.

With the proposed method backward moving objects in blind spot detection devices can be detected in automotive security application, what is desired by automotive manufacturers. The proposed method and system use motion estimation based segmentation results in order to initialize and/or update template tracking of moving objects. The method and system can be used even in cases where motion estimation based approaches completely fail, e.g. for backward moving objects in a blind spot region detection.

The template of a forward and backward moving vehicle can be tracked well over many frames using cross correlation or sum of absolute differences (SAD) as soon as the initial template is found. Template tracking works well but the problem is finding the first initial obstacle template. The proposed method and system uses motion estimation based segmentation results as the initial template.

The template is updated from time to time by replacing the previous template by a template of the same size where it was detected. The template varies in size, depending on a distance to a vanishing point in blind spot detection applications. For convenience and better memory allocation, the template can be scaled to a fixed size. The search range of the cross correlation/sum of absolute differences is limited to a plausible range around the last detection and can include prediction. The proposed updating process reduces the "drifting" problem ("template update problem").

Additionally to the ability of tracking slowly moving vehicles in the backward direction, template tracking can furthermore augment or replace permanent motion estimation. A template that is once detected can be tracked well by template tracking; and motion estimation is only used if the tracking fails. The failure of the tracking can be detected if the correlation peak is below a certain (fixed or adaptive) threshold or if the template location jumps to other local maxima.

This approach improves the segmentation results, reduces the "shaking" of the segmentation and doesn't suffer from false alarms in vehicle detection process.

If motion estimation is still continuously used in parallel, template tracking can be used for cross verification. Comparing the motion estimation results with the template tracking results can reduce false alarms that occur during motion estimation. If these results match well, the template can be updated according to the motion estimation segmentation results. Otherwise a mismatch indicates problems and might result in rejecting the template.

The invention claimed is:

1. A method of operating a camera system, the method comprising:
partitioning, in a local motion estimation unit of the camera system, each image of a sequence of images into blocks;
identifying moving blocks which have performed a movement between consecutive images of said sequence;
determining a direction and a distance of said movement of said moving blocks;
grouping, in a segmentation unit of the camera system, adjacent moving blocks, for which directions within a predetermined direction interval and distances within a predetermined distance interval have been determined into a first group of blocks; and
initializing a template for said moving object with said first group of blocks.

2. The method according to claim 1, further comprising:
extending said sequence with further images;
identifying moving blocks which have performed a movement between at least a part of said further images of said sequence;
determining a direction and a distance of said movement of said moving blocks;
grouping adjacent moving blocks, for which directions within a predetermined direction interval and distances within a predetermined distance interval have been determined into a second group of blocks; and
updating said template for said moving object with said second group of blocks.

3. The method according to any one of claims 1 or 2, further comprising:
tracking said template in said sequence based on an error criterion between said template and parts of said images.

4. The method according to claim 3, further comprising:
setting a search range around an area, where the object is expected in a subsequent image of said sequence according to its motion behavior in previous images of said sequence; and
performing said step of tracking in said search range in said subsequent image.

5. The method according to any one of claims 1 to 2, further comprising:
calculating a correlation between said template and parts of said images of said sequence; and
updating said template if said correlation is below a predetermined correlation threshold.

6. The method according to any one of claims 1 to 2, further comprising:
determining an average motion vector for a coherent group of blocks of said images;
determining a template motion vector for said template in subsequent images;
comparing said average motion vector with said template motion vector; and
rejecting said template in case of a mismatch between said average motion vector and said template motion vector.

7. A method according to any one of claims 1 to 2, further comprising:
pre-processing said images of said sequence with a global motion estimation and global motion compensation.

8. The method according to any one of claims 1 to 2, wherein said method is used for detecting moving objects in a blind spot region of a vehicle, said moving objects moving backwards in said blind spot region with respect to a movement of said vehicle.

9. A system for initializing a template for a moving object in a sequence of images, comprising:
a local motion estimation unit configured to partition each of said images of said sequence into blocks, to identify moving blocks which have moved between consecutive images of said sequence and to determine a direction and a distance of said movement of said moving blocks; and
a segmentation unit configured to initialize an initial template for said moving objects by grouping adjacent moving blocks, for which directions within a pre-determined direction interval and distances within a predetermined distance interval have been determined.

10. The system according to claim 9, further comprising:
a decision unit configured to decide whether an update of said template should be performed, said decision unit being connected to said local estimation unit.

11. The system according to any one of claims 9 to 10, further comprising:
a global motion estimation unit configured to perform a global motion estimation and global motion compensation of said images of said sequence.

12. A non-transitory computer readable storage medium encoded with instructions, which when executed by a processor cause the processor to implement a method comprising:

partitioning, in a local motion estimation unit of the camera system, each said image of a sequence of images into blocks;

identifying moving blocks which have performed a movement between consecutive images of said sequence;

determining a direction and a distance of said movement of said moving blocks;

grouping, in a segmentation unit of the camera system, adjacent moving blocks, for which directions within a predetermined direction interval and distances within a predetermined distance interval have been determined into a first group of blocks; and initializing a template for said moving object with said first group of blocks.

* * * * *